United States Patent [19]
Su et al.

[11] Patent Number: 5,885,721
[45] Date of Patent: Mar. 23, 1999

[54] MULTILAMINAR HIGH DENSITY POLYETHYLENE FILM WITH HIGH BIAXIAL ORIENTATION

[75] Inventors: Tien-Kuei Su; Robert V. Poirier, both of Fairport, N.Y.

[73] Assignee: Mobil Oil Corporation, Fairfax, Va.

[21] Appl. No.: 940,261

[22] Filed: Sep. 30, 1997

Related U.S. Application Data

[63] Continuation-in-part of Ser. No. 715,546, Oct. 3, 1996, abandoned.

[51] Int. Cl.$^6$ ...................................................... B32B 27/08
[52] U.S. Cl. ......................... 428/516; 428/500; 428/523; 428/910; 264/280; 264/288.4; 264/290.2
[58] Field of Search ..................................... 428/516, 523, 428/500, 910; 264/280, 288.4, 290.2

[56] References Cited

U.S. PATENT DOCUMENTS

| | | | |
|---|---|---|---|
| 4,564,559 | 1/1986 | Wagner, Jr. et al. | 428/349 |
| 4,565,739 | 1/1986 | Clauson et al. | 428/349 |
| 4,626,397 | 12/1986 | Bose | 264/565 |
| 4,629,525 | 12/1986 | Rasmussen | 156/84 |
| 4,650,721 | 3/1987 | Ashcraft et al. | 428/516 |
| 4,652,409 | 3/1987 | Leese et al. | 264/22 |
| 4,680,207 | 7/1987 | Murray | 428/35 |
| 4,797,235 | 1/1989 | Garland et al. | 264/22 |
| 4,870,122 | 9/1989 | Lu | 524/488 |
| 4,873,034 | 10/1989 | Kono et al. | 264/41 |
| 4,891,173 | 1/1990 | Saitoh et al. | 264/22 |
| 4,916,025 | 4/1990 | Lu | 428/516 |
| 5,006,378 | 4/1991 | Itaba et al. | 428/34.9 |
| 5,028,289 | 7/1991 | Rasmussen | 156/229 |
| 5,039,471 | 8/1991 | Yokota et al. | 264/280 |
| 5,049,347 | 9/1991 | Magill et al. | 264/280 |
| 5,106,545 | 4/1992 | Warren | 264/22 |
| 5,171,815 | 12/1992 | Magill et al. | 526/348.1 |
| 5,223,346 | 6/1993 | Lu | 428/516 |
| 5,241,030 | 8/1993 | Barry et al. | 526/348.1 |
| 5,302,327 | 4/1994 | Chu et al. | 264/22 |
| 5,302,442 | 4/1994 | O'Brien et al. | 428/213 |
| 5,411,805 | 5/1995 | Magill | 428/411.1 |
| 5,500,283 | 3/1996 | Kirk et al. | 428/349 |
| 5,527,608 | 6/1996 | Kemp-Patchett et al. | 428/349 |

FOREIGN PATENT DOCUMENTS 1287527 8/1972 United Kingdom.

OTHER PUBLICATIONS

Wilmer A. Jenkins and James P. Harrington, "Packaging foods with Plastics", (1991) *Technomic Publishing Co., Inc.* 18–19, 38–39.

Jacqueline I. Kroschwitz, Executive Editor; John Wiley & Sons, "Concise Encyclopedia Of Polymer Science And Engineering" (1990) *Wiley* 349–359, 691–694.

Marilyn Bakker, Editor–in–Chief, and David Eckroth, Managing Editor, "The Wiley Encyclopedia Of Packaging Technology" (1986) John Wiley & Sons, 313–315, 514–529.

*Primary Examiner*—Mark L. Warzel
*Attorney, Agent, or Firm*—D. P. Santini

[57] ABSTRACT

A multilaminar high density polyethylene (HDPE) film is provided having high biaxial orientation. The film includes a HDPE substrate, at least one outer layer of a propylene copolymer, and at least one layer of an adhesion promoter material positioned between the outer layer and the HDPE substrate, to efficiently mediate adhesion therebetween. The adhesion promoter is preferably a polyethylene material having a density lower than that of the HDPE base material. Preferred adhesion promoter materials include very low density polyethylene (VLDPE), high pressure low density polyethylene (HP-LDPE), linear low density polyethylene (LLDPE), and medium density polyethylene (MDPE). The film is high biaxially oriented, being, stretched in the machine direction to a degree of from about 5:1 to about 8:1, preferably from about 6:1 to about 7:1, and stretched in the transverse direction to a degree of from about 6:1 to about 15:1, preferably from about 9:1 to about 13:1.

18 Claims, No Drawings

MULTILAMINAR HIGH DENSITY POLYETHYLENE FILM WITH HIGH BIAXIAL ORIENTATION

This application is a continuation-in-part of U.S. application Ser. No. 08/715,546, filed on Oct. 3, 1996, now abandoned, which is incorporated herein by reference.

BACKGROUND OF THE INVENTION

The invention relates to methods for preparing polymer films. Specifically, the invention relates to methods of preparing high biaxially oriented high density polyethylene films and the films prepared according to such methods.

Generally, in the preparation of a film from granular or pelleted polymer resin, the polymer is first extruded to provide a stream of polymer melt, and then the extruded polymer is subjected to the film-making process. Film-making typically involves a number of discrete procedural stages, including melt film formation, quenching, and windup. For a general description of these and other processes associated with film-making, see K R Osborn and W A Jenkins, *Plastic Films: Technology and Packaging Applications*, Technomic Pub. Co., Inc., Lancaster, Pa. (1992).

Two substantially different processes are conventionally used to orient polymeric films: blowing as a tubular film, and casting as a flat film. The two processes provide films having substantially different physical characteristics. Generally, blown films tend to have greater stiffness, toughness and barrier properties. By contrast, cast films usually have the advantages of greater film clarity and uniformity of thickness and flatness, generally permitting use of a wider range of polymers and producing a higher quality film.

An optional part of the film-making process is a procedure known as "orientation." The "orientation" of a polymer is a reference to its molecular organization, i.e., the orientation of molecules relative to each other. Similarly, the process of "orienting" a film is the process by which directionality (orientation) is imposed upon the polymeric arrangements in the film. Orientation processes are employed to impart desirable properties to films, such as making cast films tougher (i.e., increasing tensile properties).

Orientation is accomplished by heating a polymer to a temperature at or above its glass-transition temperature ($T_g$) but below its crystalline melting point ($T_m$), and then stretching the film quickly. The stretching imposes intermolecular alignment on the polymer. Then, on cooling, this molecular alignment competes favorably with crystallization and the drawn polymer molecules condense into a crystalline network with the crystalline domains (crystallites) aligned in the direction of the drawing force. As a general rule, the degree of orientation introduced into the polymer is proportional to the amount of stretch applied to the film, but is inversely related to the temperature at which the stretching is performed. Moreover, higher orientation also generally correlates with a higher modulus, i.e., measurably higher stiffness and strength.

When a film has been stretched in a single direction (monoaxial orientation), the resulting film exhibits great strength and stiffness along the direction of stretch, but it is weak in the other direction, i.e., across the stretch, often splitting or tearing into fibers (fibrillating) when flexed or pulled. To overcome this limitation, two-way or biaxial orientation is employed to more evenly distribute the strength qualities of the film in two directions, in which the crystallites are sheetlike rather than fibrillar. These biaxially oriented films tend to be stiffer and stronger, and also exhibit much better resistance to flexing or folding forces, leading to their greater utility in packaging applications.

It is technically quite difficult to biaxially orient films by simultaneously stretching the film in two directions. Apparatus for this purpose is known, but tends to be expensive to employ. As a result, most biaxial orientation processes use apparatus that stretches the film sequentially, first in one direction and then in the other. Again for practical reasons, typical orienting apparatus stretches the film first in the direction of the film travel, i.e., in the longitudinal or "machine direction" (MD), and then in the direction perpendicular to the machine direction, i.e., the lateral or "transverse direction" (TD).

The degree to which a film can be oriented is dependent upon the polymer from which it is made. Polypropylene, polyethylene terephthalate (PET), and nylon are highly crystalline polymers that are readily heat stabilized to form dimensionally stable films. These films are well known to be capable of being biaxially stretched to many times the dimensions in which they are originally cast (e.g., 5× by 8× or more for polypropylene).

High density polyethylene (HDPE), however, exhibits even higher crystallinity (e.g., about 80–95%) relative to polypropylene (e.g., about 70%). As a result, HDPE films are generally more difficult to biaxially orient than polypropylene films. U.S. Pat. Nos. 4,870,122 and 4,916,025 describe imbalanced biaxially oriented HDPE-containing films that are MD oriented up to about two times, and TD oriented at least six times. This method produces a film that tears relatively easily in the transverse direction. Multi-layer films prepared according to this method are also disclosed in U.S. Pat. Nos. 5,302,442, 5,500,283, and 5,527,608, which are incorporated herein by reference.

British Patent No. 1,287,527 describes high density polyethylene films that are biaxially oriented in a balanced fashion to a degree of greater than 6.5 times in both the longitudinal dimension (i.e., MD) and the lateral dimension (i.e., TD). This method requires a specific range of orientation temperatures. Also, tie layers for increasing adhesion of coatings are said to include condensation resins of an aldehyde with an interpolymer of acrylamide, a copolymer of ethylene such as ethylene vinyl acetate, or polyurethane.

U.S. Pat. Nos. 4,891,173 and 5,006,378 each disclose methods for preparing HDPE films that require cross-linking the film, with optional biaxial orientation of the cross-linked film. It is reported that the cross-linking process, which requires irradiation of the film, improves the film's physical properties. Other cross-linking processes, such as chemically-induced cross-linking, can have similar effects.

Lower crystallinity polyethylenes are typically easier to biaxially orient. For example, U.S. Pat. No. 4,680,207 describes imbalanced biaxially oriented films of linear low density polyethylene (LLDPE) oriented by being stretched up to 6-fold in the machine direction, and up to 3-fold in the transverse direction.

U.S. Pat. No. 5,241,030 describes biaxially oriented films of a blend of at least 75% of a linear ethylene/alpha-olefin copolymer, but no more than 25% HDPE. The film can be mono- or multi-layered, and can be biaxially oriented, i.e., stretched up to 8:1 in the machine direction, and up to 9:1 in the transverse direction.

U.S. Pat. No. 5,302,327 describes an anti-fogging, heat-sealable polypropylene film. The film includes a polypropylene core and a heat sealable layer of HDPE or ethylene copolymer. These bilayer films can be machine stretched up to 7× MD, coated or corona-treated to improve wettability, and then stretched up to 10× TD.

Blown films of HDPE having a ethylene-vinyl acetate heat seal coating can be used for food packaging, but such films must have a thickness of at least about 2 mil to meet the water vapor transmission rate (WVTR) requirements for packaging suitable for dry foods such as cereals. Moreover, blown HDPE films do not exhibit the dead-fold properties desirable in food packages, particularly of the bag-in-box type.

In multilaminar films, it is conventional to modify the surface properties of a substrate material to improve the adhesion between layers (interlaminar adhesion). This can be accomplished by modifying the physical or chemical properties of the substrate material itself, or by providing an intermediate layer of a material having desirable properties. Conventional intermediate "tie" or "anchor" layers are typically made from materials such as ethylene vinyl acetates (EVA), ionomers, anhydride grafted polyolefins. These materials contain polar or ionic functional groups, enhancing adhesion between polyolefins and polar polymers such as nylons, polyesters, and ethylene vinyl alcohols (EVOH). For example, the coextrusion of nylon (polar) with polyethylene (nonpolar) requires an amphipathic tie layer such as EVA having both polar and nonpolar properties in the same molecule. W A Jenkins and J P Harrington, *Packaging Foods with Plastics,* Technomic Pub. Co., Inc., Lancaster, Pa. (1991).

U.S. Pat. No. 5,500,283 discloses biaxially oriented HDPE films coated with polyvinylidene chloride polymers, acrylic acid polymers, and polyvinyl alcohol polymers. The coating procedure can include a priming step, e.g., chlorination, chromic acid oxidation, hot air or steam treatment, flame treatment, or high voltage corona discharge. Alternatively, such priming methods can be supplemented by adding a coating of a priming material, such as a poly(ethylenimine) material.

U.S. Pat. No. 5,527,608 discloses a multilaminar film structure including a polyolefin homopolymer or block copolymer substrate, with a heat sealable layer on one side and an HDPE layer on the opposite side. In one embodiment a metallized film is produced by corona discharge- or flame-treating a surface of the extruded polymeric structure before depositing the metal on the surface.

In view of the above considerations, it is clear that existing methods for producing biaxially oriented HDPE films yield products that are deficient in desirable physical characteristics. Existing HDPE film-making methods generally require additional chemical components in the HDPE resin (e.g., cross-linking agents) and/or additional process steps (e.g., irradiation). Such limitations complicate production, and result in increased costs. Moreover, cross-linking tends to lower polymer crystallinity, resulting in higher WVTR and lower stiffness.

Accordingly, it is one of the purposes of this invention, among others, to overcome the above limitations in the production of biaxially oriented HDPE films, by providing an economical and relatively uncomplicated method of making biaxially oriented films that imparts superior characteristics to the films, without requirement for chemical additives such as cross-linking agents, and without requirement for supplemental processing steps such as irradiation of the film.

SUMMARY OF THE INVENTION

It has now been discovered that these and other purposes can be achieved by the present invention, which provides a multilaminar HDPE film and a method for making such a film. In one embodiment, the invention is a multilaminar film, comprising:
  a) an HDPE substrate comprising high density polyethylene (HDPE) having a density of at least about 0.940 $g/cm^3$ and a melt index of from about 0.1 to about 10,
  b) an adhesion promoter layer coextensively adhered to the HDPE substrate, comprising a polyethylene material having a density lower than the density of the HDPE in the HDPE substrate; and
  c) an outer layer coextensively adhered to the adhesion promoter layer, comprising a propylene copolymer,
wherein the multilaminar film is high biaxially oriented, including having been stretched to a degree of from about 5:1 to about 8:1 in the machine direction and to a degree of from about 6:1 to about 15:1 in the transverse direction.

The polyethylene material of the adhesion promoter layer can be selected from the group consisting of very low density polyethylenes (VLDPE), high pressure low density polyethylenes (HP-LDPE), linear low density polyethylenes (LLDPE), medium density polyethylenes (MDPE), blend of two or more of these, and blends of one or more of these with a high density polyethylene.

Preferred adhesion promoter materials include medium density polyethylenes and blend of a low density polyethylene and high density polyethylene. For example, the polyethylene material of the adhesion promoter layer can be a blend of a low density polyethylene and a high density polyethylene, comprising from about 2 wt % to about 50 wt % LDPE, more preferably comprising from about 5 wt % to about 25 wt % LDPE.

Also, the propylene copolymer of the outer layer desirably has a rate of crystallization and a crystallinity lower than that of the HDPE of the substrate. The propylene copolymer of the outer layer can be a propylene copolymer or terpolymer comprising at least about 80% propylene with at least one other alpha olefin. Preferably, the propylene copolymer of the outer layer is a propylene-ethylene copolymer comprising about 96.5% propylene and about 3.5% ethylene or a propylene-ethylene-butylene terpolymer comprising about 93% propylene, about 3% ethylene, and about 4% butylene.

The multilaminar film can further comprise:
  (a) first and second adhesion promoter layers coextensively adhered to first and second sides of the base layer, respectively; and
  (c) first and second outer layers, coextensively adhered to the first and second adhesion promoter layers, respectively.

In another embodiment, the invention is a method of making a biaxially oriented high density polyethylene (HDPE) film as described above, comprising:
  biaxially orienting in the solid state a multilaminar HDPE sheet comprising:
    (a) an HDPE substrate comprising HDPE having a density of at least about 0.940 $g/cm^3$ and a melt index of from about 0.1 to about 10,
    (b) an adhesion promoter layer coextensively adhered to the HDPE substrate, comprising a polyethylene material having a density lower than that of the HDPE in the HDPE substrate; and
    (c) an outer layer coextensively adhered to the adhesion promoter layer, comprising a propylene copolymer,
  wherein the biaxially orienting comprises machine direction stretching the multilaminar HDPE sheet to a degree of from about 5:1 to about 8:1, and transverse direction stretching the multilaminar HDPE sheet to a degree of from about 6:1 to about 15:1, thereby providing a biaxially oriented HDPE film.

The method can also comprise biaxially orienting a multilaminar HDPE sheet comprising first and second adhesion promoters coextensively adhered to first and second sides of the HDPE, substrate, respectively, and first and second outer propylene copolymer layers coextensively adhered to the first and second adhesion promoter layers, respectively.

Accordingly, the invention provides the artisan with an improved method for controlling the production of multilaminar HDPE films, especially films that are high biaxially oriented. The multilaminar films have improved interlaminar adhesion, providing increased integrity during orientation procedures, with especial advantage in resisting delamination under the high stress of high biaxial orientation. In addition, the invention provides films having high clarity, and other desirable properties such as excellent WVTR characteristics, flex-crack resistance, tensile strength, impact strength, and cold strength.

These and other advantages of the present invention will be appreciated from the detailed description and examples that are set forth herein. The detailed description and examples enhance the understanding of the invention, but are not intended to limit the scope of the invention.

DETAILED DESCRIPTION OF THE PREFERRED EMBODIMENTS

The present invention provides a biaxially oriented film of high density polyethylene (HDPE). As the term is used herein, "high density polyethylene" is defined to mean an ethylene-containing polymer having a density of 0.940 or higher. (Density (d) is expressed as $g/cm^3$.) Generally, while HDPE having a density of 0.940 and above is acceptable for use, HDPE of higher density is preferred, with HDPE having a density of 0.950 or greater being more preferred. As the density of HDPE increases from 0.940 to 0.960 and higher, tensile strength increases substantially, and the WVTR drops substantially. Toughness and impact strength are much higher in the high molecular grades. K R Osborn and W A Jenkins, *Plastic Films: Technology and Packaging Applications,* Technomic Publishing Co., Inc., Lancaster, Pa. (1992). While density is an important characteristic of HDPE, it is also recognized that the HDPE suitable for use in the invention generally has a crystalline melting point in the range of from about 265° F. (~130° C.) to about 280° F. (~137° C.), and a crystallinity of about 80–95%.

The Melt Index (MI) of the HDPE useful according to the invention is in the range of from about 0.1 to about 10. (Melt Index is expressed as g/10 min.) More preferably, the HDPE has a melt index in the range of from about 0.2 to about 2.0. Melt index is generally understood to be inversely related to viscosity, and decreases as molecular weight increases. Accordingly, higher molecular weight HDPE generally has a lower melt index. Methods for determining melt index are known in the art, e.g., ASTM D 1238.

The high density ethylene-containing polymers suited for use in the invention include not only homopolymers of ethylene, but also copolymers of ethylene with higher alpha olefins. Suitable high density polyethylenes meeting the requisite criteria are commercially available. Series of HDPE resins having ranges of physical properties are available from various manufacturers. A particularly preferred HDPE is the resin sold as M6211 by Lyondell Petrochemical Company, Houston, Tex. Other suitable HDPE resins include, for example, BDM 94-25 available from Fina Oil and Chemical Co., Dallas, Tex., and 19C and 19F available from Nova Corporation, Sarnia, Ontario, Canada.

HDPE useful according to the invention can include a copolymer of ethylene with a minor amount of another alpha olefin. Preferred alpha olefins include $C_3$–$C_8$ alpha olefins. Copolymers of ethylene (e.g., about 50% or more) with a minor amount of 1-propylene or 1-butylene are more preferred. By selecting the appropriate co-monomer, HDPE films can be manufactured having particular desired physical characteristics, e.g., crystallinity and density.

The HDPE can be composed exclusively of a single HDPE resin, a mixture (blend or alloy) of HDPE resins, or HDPE containing a minor proportion of other resource polymers (polyblend). For example, the HDPE can contain up to about 10 percent by weight (wt %) microcrystalline wax, to improve processability. These HDPEs typically have melt indices in the range of from about 0.5 to about 10, and they are usually selected to result in a blend having the desired melt index, e.g., from about 0.7 to about 2. A mixture of HDPE resins generally results in better processing characteristics in the extruder by reducing extruder torque.

The HDPE blends can include two or more HDPEs, each of which preferably has a density of 0.940 or greater. Blends of HDPE polymers advantageously include a major proportion (i.e., 50 wt % or more) of a HDPE having a melt index of 0.2 to 2, and one or more polymers having different melt indices. For example, HDPE terblends have been found to be suitable for use according to the invention. Suitable terblends can, for example, include 50 to 98 wt %, preferably 84 to 96 wt % of HDPE having a density of 0.940 or higher and a melt index of greater than 0.2 to about 2.0; 1 to 25 wt %, preferably 3 to 8 wt % of HDPE having a density of 0.940 or greater and a melt index of 0.1 to 0.5; and 1 to 25 wt %, preferably 3 to 8 wt %, of HDPE having a density of 0.940 or higher and a melt index of greater than 2 to about 8. Preferably, the second and third HDPE polymers, which are minor components, are present in about equal amounts. Other HDPE blends and terblends can also be used.

Blends (alloys, polyblends) of HDPE with a minor amount of one or more other polymers are also useful to select the physical properties of the resulting film. For example, a minor proportion of a high crystallinity polymer such as polypropylene can be included. Alternatively, lower crystallinity or amorphous polymers, such as polystyrene, styrene-butadiene copolymer, or polyvinyl acetate, can be included. U.S. Pat. No. 4,191,719, for example, describes HDPE materials that are blends including five different components. Accordingly, the basic HDPE material includes at least about 50 wt % HDPE, and preferably at least about 90 wt % HDPE.

In another alternative, the film can include a base material that is a blend of HDPE and another polyethylene such as a low density PE (LDPE), ultra-low density PE (ULDPE), or a linear low density PE (LLDPE). The skilled artisan will understand that these other types of polyethylene can be employed in minor amounts to adjust the physical properties of the resulting, films for particular purposes. In this embodiment, the base material includes at least about 50 wt % HDPE, and preferably at least about 90 wt % HDPE.

The film of the invention is biaxially oriented to a relatively higher degree than has been previously possible. The high degree of biaxial orientation of the HDPE film is an important aspect of this invention inasmuch as the proper degree of orientation has been found to impart desirable physical properties to the resulting film. Specifically, the orientation method of the invention introduces to the film such desirable properties as excellent WVTR characteristics, flex-crack resistance, tensile strength, impact strength, and cold strength. These properties can all be measured by means of standard techniques known in the art. See, e.g., 1994 *Annual Book of ASTM Standards,* American Society for Testing and Material, Philadelphia, Pa. (1994); or *TAPPI Test Methods* 1994–1995, TAPPI Press, Atlanta, Ga. (1994). The film of the invention also possesses better dead-fold properties. Dead-fold is generally assessed by qualitative means, but can be indicated by crease retention as determined by ASTM D-920-49 (% crease retention after 30 sec). These improved physical properties make the film of the invention ideally suited for packaging, even for packaging foods and other materials containing liquids. These physical properties also make the films well suited for use in labels and other similar applications.

The film of the invention is biaxially oriented in the solid state. The biaxial orientation includes MD stretching the film to a degree of from about 5:1 to about 8:1, preferably from about 6:1 to about 7:1. More preferably, the film is MD stretched to a degree of from about 6:1 to less than 6.5:1. The biaxial orientation also includes TD stretching the film to a degree of from about 6:1 to about 15:1, preferably from about 9:1 to about 13:1.

The skilled artisan will recognize that HDPE films might be prepared having balanced biaxial orientation, in which the TD stretching and the MD stretching are substantially equal.. However, it has been unexpectedly found that a highly biaxially oriented HDPE film benefits from imbalanced orientation, i.e., biaxial orientation in which TD orientation and MD orientation are unequal. More specifically, the film benefits from an orientation imbalance in which TDO is greater than MDO.

The properties of the film can be selectively controlled by adjusting the stretch ratio of the film, which is defined as the ratio of the degree of transverse direction stretch (TDX) to the degree of machine direction stretch (MDX), i.e., the ratio TDX/MDX. Thus, a film that is MD stretched about 6:1 and TD stretched to about 9:1 will have a stretch ratio of TDX/MDX=9/6, or about 1.5. A balanced film has a stretch ratio of about 1. Thus, the film of the invention preferably has a TDX/MDX ratio greater than 1. For example, a film of the invention can be stretched in the machine direction to a degree of up to 6.5:1, and stretched in the transverse direction to a degree of about 10.5:1, to provide a TDX/MDX ratio of about 1.6.

The skilled artisan will appreciate from the disclosure provided herein that the film of the invention is not only of imbalanced biaxial orientation, but that the imbalanced film is oriented to a high degree in both directions. Thus, the film of the invention is said to have "high biaxial orientation," or "imbalanced high biaxial orientation."

The high biaxial orientation of a film prepared according to the invention imposes high dimensional alteration on the film, manifested as a substantial increase in the surface area of the film. The resultant increase in surface area is substantially equal to the product of the stretch factors. For example, a HDPE film oriented according to the invention by MD stretching by a factor of 6:1 (i.e., 500% increase) and TD stretching by a factor of 9:1 (i.e., 800% increase), will have 6×9=54 times the surface area of the original sheet (5,400% of the original).

The dimensional alteration that is seen as an increase in the surface area is accompanied by a concomitant decrease in film gauge (thickness). Gauge decrease is directly proportional to the product of the stretch factors, and is usually substantially equal to that number. Accordingly, in the example above, the final film gauge following the biaxial orientation procedure is generally about 6×9=54 times smaller than the gauge of the original HDPE sheet. Thus, to produce a film having a final thickness of 1.0 mil, oriented 6 MD×9 TD, the original sheet thickness should be about 54 mil. Because of the high degree of biaxial orientation, therefore, the sheet to be oriented must typically be of high gauge. The high biaxial orientation process of the invention permits dimensional alterations of from about 30-fold to about 120-fold. Thus, a high gauge HDPE sheet is a sheet that is from about 30 to about 120 times thicker than the desired HDPE film, depending upon the MD and TD stretch factors being employed.

The film of the invention is produced using conventional casting apparatus. For example, cast extrusion is generally accomplished using a standard multi-roll stack system or a cast roll with an air cap (high velocity air applied to the outside of the sheet). Other casting apparatus is also useful, such as a cast roll and water bath system, although this type of system can affect film clarity, generally yielding a rougher and more opaque film.

Following casting, the sheet of cast material is oriented using conventional orienting apparatus. Usually, the sheet is oriented sequentially, preferably being first MD stretched and then TD stretched. Thus, the cast material is typically heated (optionally including a pre-heating stage) to its orientation temperature and subjected to MD orientation between two sets of rolls, the second set rotating at a greater speed than the first by an amount effective to obtain the desired draw ratio. Then the monoaxially oriented sheet is TD oriented by heating (again optionally including pre-heating) the sheet as it is fed through an oven and subjecting it to transverse stretching in a tenter frame. Alternative stretching methods are possible, including employing apparatus capable of simultaneous stretching, or stretching sequentially first in the transverse direction and then in the machine direction. It is known that these methods often suffer from serious technical limitations rendering them impracticable or overly expensive.

For the present invention, the high biaxial orientation processes, including any preheating step as well as the stretching step, are performed using equipment temperatures in the range of from about the glass transition temperature ($T_g$) of the HDPE to above the crystalline melting point ($T_m$) of the HDPE. More specifically, MD orientation is conducted at from about 140° F. to about 320° F., more preferably from about 230° F. to about 295° F. TD orientation is conducted at from about 230° F. to about 320° F., more preferably, from about 255° F. to about 295° F. The skilled artisan will understand that the orientation temperature employed in a particular situation will generally depend upon the residence time of the sheet and the size of the rolls. Apparatus temperature higher than the $T_m$ of the HDPE sheet may be appropriate if the residence time is short. The skilled artisan also understands that the temperatures involved in these processes are in relation to the measured or set temperatures of the equipment rather than the temperature of the HDPE itself, which generally cannot be directly measured.

The overall thickness of the biaxially oriented film is not critical, and can range from about 0.25 mil to about 10 mil. However, it is another advantage of the process of the invention that the resultant film has excellent gauge profile, even when thickness is less than 1 mil. Films of 0.7 mil have been produced having excellent gauge profile and other superior properties. For example, it has been determined that the films of this invention having a thickness of from about 0.25 mil to about 2 mil will have excellent WVTR (g-mil/100 in$^2$–24 hr–1 atm) of less than about 0.2/mil, whereas a somewhat heavier gauge (1.5 times thicker or more) is needed in a blown HDPE film to achieve a comparable WVTR.

Although HDPE resin having a density of 0.957 or greater can be directly made into thin films by cast extrusion, problems of curling, uniformity, flatness, and high WVTR have remained as obstacles. Accordingly, thin HDPE films of about 0.8 to 1.5 mil having the best balance of properties, particularly for VFFS applications, are obtained in the highly biaxially oriented films of this invention when prepared from extrudates having a thickness of from about 15 mil to about 200 mil. Generally, irrespective of actual thickness, the HDPE material at any stage between casting and completion of the requisite biaxial orienting is herein referred to as a sheet, while the HDPE material is referred to as a film following the biaxial orienting.

As noted hereinabove, the high biaxial orientation employed in the invention requires use of cast HDPE sheets having substantially higher thicknesses than are currently used for monoaxial orientation. Applicants have found that such high gauge HDPE sheets pose specific handling problems in their preparation. In particular, the high gauge HDPE sheets are so thick that cooling on the cast rolls is difficult to efficiently accomplish. Use of a relatively low cast roll temperature, e.g., ~140°–160° F., which would otherwise be acceptable for handling a thinner HDPE sheet, tends to result in curling of the thicker sheet away from the cast roll. Also, such lower temperatures often cause roughened and uneven edges, leading to problems of tearing. Despite such problems, it has unexpectedly been found that the casting process can be beneficially modified to provide sheets having the desired characteristics for biaxial orienting procedures.

Applicants have made a surprising observation that a much higher cast roll temperature, e.g, ~200 ° F. or higher, can be used to keep the sheet adhered to the cast roll such that curl is avoided and suitable edges are formed, thereby making the subsequent orientation procedure feasible. However, while this approach does produce high gauge sheets suitable for use in the high biaxial orientation process, the high casting temperatures introduce practical difficulties into the casting process itself. For example, a high cast roll temperature diminishes the net temperature difference between the cast roll and the film, thereby reducing the rate of heat transfer out of the film. Moreover, higher cast roll temperatures impose disadvantages in the use of a water bath for cooling the film, since the water removes a great deal of heat from the roll, making cast roll temperature maintenance difficult. Also, the higher temperatures cause significant increases in mineral deposits left on the machinery (and potentially transferable to the film) by evaporated water from the bath.

Alternatively, it has unexpectedly been found that curling of the HDPE sheet can be avoided, even when a lower temperature cast roll is used, if the HDPE being cast is provided with an outer layer of a casting promoter material. A casting promoter is a material that promotes the casting process by substantially improving the casting characteristics of the HDPE material to avoid some or all of the problems described herein. For example, use of a casting promoter, among other things, reduces or eliminates curling of the sheet and improves edge uniformity during casting while simultaneously permitting the use of substantially lower casting temperatures. Such casting promoter materials improve the processing capability for the sheet apparently by permitting optimization of the rate of heat transfer from the sheet without engendering defects such as curling, etc. Accordingly, the casting promoter can be any material that promotes the casting of a high gauge HDPE sheet.

The casting promoter is preferably a polyolefinic material, i.e., a homopolymer, copolymer, or terpolymer of an alpha olefin, or a blend of polymeric materials comprising a major proportion of one or more polyolefins. It is believed that the casting promoter may act to maintain the sheet on the cast roll by reducing shrinkage of the sheet during the cooling process. The rate of shrinkage is believed to be related to the rate of crystallization and the degree of crystallinity in the casting promoter polymer. Thus, the casting promoter is preferably a polyolefinic material that exhibits lower shrinkage than the HDPE. Accordingly, the casting promoter should have a rate of crystallization and a degree of crystallinity that is lower than that of the HDPE. Since the crystallinity of a polyolefin generally correlates with its density, the density of the casting promoter typically is lower than that of the HDPE. Preferably, the density of the casting promoter material is below about 0.945. For example, a medium density polyethylene (e.g., Dowlex 2027 (d=0.942) from Dow Chemical Co. Midland, Mich.) can be used as a casting promoter according to the invention. Alternatively, a blend of low density polyethylene and HDPE can be used. For example, LDPE/HDPE blends containing from about 2 wt % to about 50 wt % HDPE, preferably from about 5 wt % to about 25 wt % HDPE, have proven capable of functioning as casting promoter materials.

Preferred casting promoter materials include copolymers or terpolymers of a major proportion of propylene with a minor proportion of at least one other alpha olefin. More preferably, use of a copolymer of propylene and ethylene, or a terpolymer of propylene, ethylene, and butylene, will yield a high quality film according to the invention. A propylene-ethylene copolymer containing about 80% propylene and up to about 20% ethylene, preferably from about 1% to about 5% ethylene, and more preferably about 3.5% ethylene, has excellent casting promoter qualities. Exemplary commercially available propylene-ethylene copolymers include the propylene-ethylene copolymers 6573XHC (98% propylene and 2% ethylene) and 8573HB (96.5% propylene and 3.5% ethylene), both available from Fina Oil and Chemical Co., Dallas, Tex. Propylene-ethylene-butylene (P/E/B) terpolymers containing at least about 80% propylene are again preferred. Preferably, the P/E/B terpolymer contains from about 2% to about 7% ethylene, more preferably about 3% ethylene, and contains from about 2% to about 7% butylene, more preferably about 4% butylene, with the balance being propylene. An exemplary commercially available propylene terpolymer is the propylene-ethylene-butylene terpolymer #7510 (93% propylene, 3% ethylene, and 4% butylene), from Chisso Corp., Tokyo, Japan. Surprisingly, these materials also impart beneficial improvements in optical properties, including increased gloss and reduced haze.

The propylene copolymer of the outer layer can also be blended with another polymer to provide a material that improves the heat sealability of the film. Such materials include, for example, LDPE or ethylene-vinyl acetate (EVA), as well as other equivalent materials. Such dual function blends act not only as casting promoters but provide the resulting films with heat sealability, thereby avoiding the need to separately apply a heat seal skin layer. For example, Applicants have obtained beneficial results using blends of a propylene/ethylene copolymer and up to about 35 wt % LDPE or up to about 20 wt % EVA.

The casting promoter material is generally provided as an outer layer on at least one surface, preferably on both surfaces, of the HDPE material prior to casting by means of co-extrusion. Preferably, the laminated co-extrudate includes up to about 20 wt % of the total weight of the film as the outer layer or layers. Preferably, each outer layer of the casting promoter constitutes from about 1% to about 10% of the total thickness of the sheet. The skilled artisan will appreciate that different types and/or amounts of casting promoter materials can be employed in the same application if different properties are required on opposite sides of the HDPE substrate.

High biaxial orientation processing of HDPE materials, as noted, has previously proven difficult to achieve. The use of casting promoter materials as described above alleviates certain of these difficulties, notably making the casting process easier to perform by lowering casting temperatures. However, as described below it has surprisingly been found that other limitations on the high biaxial orientation process can be further amelioriated by providing additional modification to the film structure. Specifically, It has now been observed that the machine direction orientation temperature ($T_{MDO}$) can be substantially lowered below that normally required for the high biaxial orientation process if an intermediate layer of lower density resin is employed between the casting promoter and the HDPE substrate.

Accordingly, in the high biaxially oriented multilaminar film according to the invention there is preferably provided an intermediate layer of a material that promotes adhesion between an outer layer and the base or substrate HDPE layer. Each "adhesion promoter" layer should be at least substantially coextensive with the overlying outer layer and the underlying base layer, and positioned therebetween to mediate adhesion of the outer layer(s) to the base layer.

Unlike known tie layers, which are conventionally used for tying polyolefins to polar polymers, Applicants have unexpectedly found that materials capable of acting as adhesion promoters according to the invention include substantially softer hydrocarbons. These adhesion promoters improve structural integrity of multilaminar high biaxially oriented HDPE films as otherwise described herein. In particular, when a propylene polymer is provided as an outer layer over a HDPE substrate, an adhesion promoter according to the invention promotes interlaminar adhesion under the stressful processing conditions required to high biaxially orient such films. However, another advantage of the use of an adhesion promoter is that lower MD orientation temperatures can be used without stress-induced delamination. Because stretching a film at a lower temperature introduces greater orientation than does stretching at a higher temperature, the lower MDO temperatures enabled through use of an adhesion promoter as described permits a greater degree of orientation in the resulting film.

Suitable adhesion promoter materials include, for example, low density polyethylene materials, i.e., polyethylenes having a density lower than that of the HDPE used in the base layer of the multilaminar structure. Typically, the class of low density polyethylenes is defined to include those that have densities of less than 0.940.

Accordingly, adhesion promoter materials include, for example, very low density polyethylenes (VLDPE), high pressure low density polyethylenes (HP-LDPE), linear low density polyethylenes (LLDPE), and medium density polyethylenes (MDPE). Alternatively, blends of two or more of these materials, or blends of one or more of these with a high density polyethylene, can also be effective to achieve the desired improvement in skin layer adhesion. If a blend of a low density polyethylene and a high density polyethylene is used, the net density of the blend should be less than the density of the HDPE of the substrate or base layer.

Suitable lower density polyethylenes are commercially available. For example, VLDPE is available as product No. 1137, from Union Carbide (MI=0.8; d=0.906; comonomer= butene), and product No. XPR 0545-33260 46L, from Dow Chemical (MI=3.3; d=0.908; comonomer=octene). VLDPE typically has a density of from about 0.890 to about 0.915.

HP-LDPE is available as product number 1017, from Chevron, San Francisco, Calif. (MI=7; d=0.918). HP-LDPE typically has a density of from about 0.915 to less than about 0.940.

LLDPE is available as Dowlex™ 2045.03, from Dow Chemical (MI=1.1; d=0.920; comonomer=octene). LLDPE typically has a density of from about 0.910 to about 0.935.

MDPE is available as HCX-002 From Mobil Chemical Corp, Fairfax, Va. (MI=4; d=0.940). MDPE typically has a density of from about 0.926 to about 0.940.

Blends of the above materials, or of any of these materials with an HDPE resin can be made by the artisan as desired to achieve specific properties. Typically, such blends are prepared on-line.

It is possible to characterize suitable adhesion promoters based on the physical properties of the resins or resin blends. Typically, the adhesion promoter has a melt index of from about 0.5 to about 20, preferably from about 1 to about 5. The density of the adhesion promoter is typically from about 0.890 to about 0.958, preferably from about 0.935 to about 0.956. It is preferred that the density of the adhesion promoter be lower than the density of the substrate HDPE material. It is in some cases preferred that the adhesion promoter resin have a higher melt index than the core HDPE. It is further preferred that the adhesion promoter have a lower crystallinity and greater elasticity than the substrate HDPE material.

Accordingly, the films of the invention may have a multilaminar structure ADBDA, in which A is an outer layer comprising a propylene polymer, B is the HDPE substrate, and D is an adhesion promoter layer. Of course other, structures such as a trilaminar ADB film can be produced, comprising a single outer layer A, with the adhesion promoter layer D mediating adhesion to the HDPE substrate B. Structures such as ABCB'A' are also contemplated, wherein the adhesion promoter layers B and B' are the same or different and the outer layers A and A' are the same or different. The invention includes films in which a casting promoter layer is provided together with an adhesion promoter layer, to enable substantially improved outer layer adhesion as well as improved casting and orientation.

The biaxially oriented HDPE film of this invention can beneficially be provided with at least one skin layer coextensively adhered to a base material including the HDPE. Processes are known for manufacturing films having multiple layers, including up to five or more such layers. Skin layers can be employed to obtain desirable functional properties in these films. In particular embodiments, e.g., for packaging applications, it may be preferred that the film include a heat seal layer. For printing applications or label applications, a skin layer that improves printability (e.g., receptivity to inks) may be desirable. For example, an acrylate layer may be desirable to improve receptivity to acrylic-based inks. Other layers can be made of polymers having desirable barrier properties for gases such as oxygen. Methods for applying such skin layers to olefinic films are known in the art, as are skin layer materials suitable for adapting such films to different purposes.

Skin layers can be applied to the HDPE film in various ways. Skin layer materials can be applied to the base HDPE material during extrusion, after extrusion but prior to orientation, between sequential orientation steps, or even following completion of the requisite biaxial orientation. Methods of manufacturing multilayer film structures (laminated structures) include, for example, co-extrusion, in which two or more polymer melts are extruded together without the melts mixing to a significant extent. The resulting co-extrudate possesses a laminar structure. Another lamination method is extrusion lamination, in which a coating layer is extruded onto a preformed base sheet. Another method is co-lamination, in which a base layer and a skin layer are nipped into intimate contact and then subjected together to orientation. This type of method can employ base layers and skin layers prepared off-line. Alternatively, a base layer can be oriented in one direction, a skin layer then applied, and the composite material then oriented in the other direction. In adhesive lamination, an intermediate adhesive or bonding layer is provided between a base film and the desired coating layer. Alternatively, when additional lamina(s) are added to a previously extruded film, the surface of the film can be prepared to receive the added lamina(s) by pretreatment according to known methods, including chemical oxidation, flame treatment, corona discharge, and the like. Laminating methods that can be adapted for use with the films of the invention are described, for example, in U.S. Pat. Nos. 4,916,025, 5,223,346, 5,302,442, 5,527,608, and 5,500,283, which are all incorporated herein by reference. The skilled artisan will appreciate the various modes of lamination and their utility to the application of particular types of skin layers.

If a heat seal layer is desired, the layer can be made from any of the conventional materials used for this purpose in conjunction with polyolefin, particularly polyethylene, films. For example, ethylene-vinyl acetate copolymers or ethylene-methacrylic acid salt ionomers can be used (e.g., SURLYN from Dupont). Ethylene-methacrylic acid salt ionomers have been found to be particularly useful in preparing heat-sealable films suitable for VFFS applications. The heat seal layer can include the heat seal resin alone or with small amounts of other materials. For example, the relatively costly SURLYN ionomer can be mixed with small amounts of less costly materials such as low density polyethylene.

Various skin layers can be applied to satisfy the requirements for other applications. For example, methods are known for making films adapted for use in printing, e.g., films having enhanced printability useful for making labels and paper substitutes. Skin layers that improve receptivity to or retention of inks, including water-based inks, and are suitable for use in preparing labels, whether opaque or transparent, are described in commonly owned application Ser. No. 08/164,598, which is incorporated herein by reference. Acrylate skin layers can be employed to improve retention of acrylic-based inks.

The film can be treated to improve its wettability or adhesion to inks and other coatings. Such treatments are conventional and known in the art, for example, exposing the film to corona discharge, flame treating, and the like.

The film of the invention can also be metallized according to methods known in the art. For example, one such method for applying a metallized skin layer to the HDPE film is described in commonly owned patent application Ser. No. 08/455,734, which is incorporated herein by reference. Such metallized films can replace metallic foils in many applications.

Additives can also be incorporated into the polymeric materials of the film, either in the HDPE base material, in an outer layer, or in a skin layer. Numerous such materials are known, as are methods for their incorporation into films. Suitable additives include, without limitation, antioxidants, fillers, particulates, dyes, pigments, light stabilizers, heat stabilizers, anti-static agents, slip agents, anti-blocking agents, cavitating agents, abrasives, and the like.

Opacifying agents can be included in the biaxially oriented HDPE film of the invention. Such agents are typically included in a proportion of up to about 10 wt %, preferably at least about 1 wt %. Such agents can be included in the HDPE resin prior to extrusion. Suitable opacifying agents include, e.g., iron oxides, carbon black, aluminum, aluminum oxide, titanium dioxide, and talc.

In an especially preferred embodiment, cavitating agents or void initiating particles are included in the film in amounts up to about 25 wt %. Such agents are typically added to the HDPE melt prior to extrusion and are capable of generating voids (cavities) in the structure of the film during the film-making process. It is believed that small inhomogeneities introduced into the HDPE by the cavitating agent result in points of weakness in the sheet. The biaxial orienting process then induces small tears in the HDPE, causing cavitation in the processed film. Suitable cavitating agents include, for example, finely ground inorganic materials such as calcium carbonate ($CaCO_3$). Organic cavitating agents are generally less preferred due to their limited operating temperature range. However, such organic cavitants may be useful if they are extremely finely divided and are either resistant to melt at operating temperatures or produce a suitable inhomogeneity in the HDPE material. Cavitating agents can be included using methods known in the art, such as that described in application Ser. No. 07/993,983, incorporated herein by reference. Accordingly, in the method of the invention in which a cavitating agent is employed, $CaCO_3$, polystyrene, or other cavitant can be included in an amount of from about 5 wt % to about 25 wt % in a core of HDPE. Applicants are not presently aware of any commercially practicable process for making biaxially oriented, cavitated HDPE films. It is, therefore, another advantage of the invention that the method is useful for making cavitated films exhibiting physical properties (e.g., improved gauge control) that are substantially better than previously possible.

In a multi-layer film, in which the HDPE constitutes a base or core layer, one or more outer layers can be applied to one or both surfaces of the film. In such cases, the HDPE base layer will usually represent from about 70% to about 95% of the thickness of the overall film, or even a higher percentage thereof. Most commonly, such other layers are applied by being co-extruded thereon, e.g., co-extruded from a conventional extruder through a flat sheet die, the melt streams being combined in an adapter and/or a multicavity die prior to extrusion. Upon extrusion from the die, the laminated structure is chilled and quenched, and then subjected to the high biaxial orientation process. Finally, the edges of the film can be trimmed, and it is then wound on a roll.

The following examples are provided to assist in a further understanding of the invention A series of experiments was performed to illustrate features and advantages of the present invention. In each case, sheets were manufactured using conventional extrusion and casting equipment, and orientation was performed using conventional orienting equipment. In all of the experiments, the HDPE polymer was Lyondell M6211 (d=0.958, MI=0.95). Details pertinent to individual experiments are explained. The particular materials and conditions employed are intended to be further illustrative of the invention and are not limiting upon the reasonable scope thereof.

EXAMPLE 1

Samples I–K together illustrate specific unexpected advantages obtained by employing a casting promoter material in casting the HDPE sheet.

TABLE I

| Samp. | Cmpsn. | $T_{Cast}$ (°F.) | MDX | $T_{MDO}$* (°F.) | TDX | $T_{TDO}$* (°F.) | Haze (%) | Gloss (%) | Gauge (mil) |
|---|---|---|---|---|---|---|---|---|---|
| I | HDPE | 215 | 6.2 | 257/263 | 11 | 318/255 | 40 | 27 | 0.8 |
| J | 3% P/E/B | 120 | 6.0 | 250/250 | 11 | 319/260 | 26 | 32 | 0.7 |
| K | 3% P/E | 120 | 6.0 | 260/270 | 11 | 325/262 | 7 | 85 | 0.8 |

*Preheat/Stretch temperatures
P/E/B = 93% propylene/3% ethylene/4% butylene terpolymer (#7510; Chisso Corp., Tokyo, Japan)
P/E = 98% propylene/2% ethylene copolymer (6573XHC; Fina Oil and Chem. Co., Dallas, TX)

Sample I included no casting promoter, and required the use of a high temperature (215° F.) cast roll. Samples J and K were cast as trilaminar sheets, each including a layer of casting promoter on either side of the HDPE core material. Each casting promoter layer constituted 3% of the total weight of the sheet. Specifically, Sample J included layers of a terpolymeric casting promoter, and Sample K included layers of a copolymeric casting promoter. In each case, the casting promoter layers permitted casting of the HDPE sheet at 120° F., a temperature reduction of 95° F.

Both of the casting promoter materials yielded sheets capable of high biaxial orientation according to the invention. These casting promoter materials also imparted further unexpected beneficial properties to the final oriented films, including improved haze and gloss. Specifically, the terpolymeric casting promoter reduced haze to only 26% in Sample J, as compared to 40% in Sample I; and increased gloss to 32%, as compared to 27% in Sample I. (These benefits were probably compromised to some extent by the use of a water bath to chill the cast sheet, a process that generally degrades optical properties.) The copolymeric casting promoter used in Sample K improved the haze and gloss further, reducing haze to only 7% and increasing gloss to 85%. Haze was evaluated according to ASTM D1003-92, and gloss was evaluated according to ASTM D2457-90 at a 45° angle.

EXAMPLE 2

Samples N and O illustrate advantages obtained by providing an orientation imbalance in the film of the invention.

TABLE II

| Sample | Cmpsn. | $T_{Cast}$ (°F.) | MDX | $T_{MDO}$* (°F.) | TDX | $T_{TDO}$* (°F.) |
|---|---|---|---|---|---|---|
| N | HDPE | 210 | 6.5 | 280/280 | 6.5 | 300/255 |
| O | HDPE | 210 | 6.0 | 280/285 | 9.5 | 298/250 |

*Preheat/Stretch temperatures

Sample N was a film prepared to have balanced orientation, i.e., 6.5 MDX and 6.5 TDX. Sample O was a film prepared from a sheet identical to that used for Sample N, but prepared to have an orientation imbalance, i.e., 6.0 MDX and 9.5 TDX. (The process conditions for casting and orienting the two films were substantially identical.) The balanced film (Sample N) exhibited a MD gauge band running down its center, causing wide fluctuation in gauge and preventing practical utility as a film. It has been observed that gauge in the TD cannot be made uniform when typical tentering conditions are used to make a film having balanced orientation. Sample O, by contrast, shows that gauge uniformity can be obtained by changing the mechanical orientation to provide imbalanced orientation. Sample O provided a film 1.0 mil thick, and having a highly uniform gauge profile.

The differences in gauge profile of Samples N and O were determined. Gauge profile in the transverse dimension was measured by means of a micrometer by taking sets of 25 measurements spaced 1" apart along a 24" section in the center of the film. Sets of gauge measurements taken at three different positions along the length of the films. The film of Sample N was 36" wide, while the film of Sample O was 55" wide. The film having balanced orientation (Sample N) exhibited wide variability in gauge, while the film having imbalanced orientation (Sample O) exhibited substantially uniform gauge.

EXAMPLE 3

The following films were prepared to illustrate the invention:

TABLE III

| Sample | Outer Layer | Adhesion Promoter | $T_{MDO}$ (°F.) | Quality |
|---|---|---|---|---|
| T | 2% EP | None | 283 | Poor |
| U | 2% EP | 90% HDPE/10% LDPE | 283 | Good |
| V | 2% EP | 80% HDPE/20% LDPE | 283 | Good |
| W | 2% EP | 100% MDPE | 283 | Good |
| X | 3.5% EP | 90% HDPE/10% LDPE | 283 | Good |
| Y | 3.5% EP | 90% HDPE/10% LDPE | 280 | Good |
| Z | 3.5% EP | 90% HDPE/10% LDPE | 275 | Good |

2% EP = 2% ethylene/propylene copolymer Fina 6573XHC: MF = 8.
3.5% EP = 3.5% ethylene/propylene copolymer Fina 8573HB; MF = 6.
LDPE = Chevron 1017: MI = 7 g/10 min; density = 0.918.
MDPE Mobil HCX-002: MI = 4 g/10 min; density = 0.940.

These films were all high biaxially oriented: stretched to a degree of 6 MDX by 11 TDX. The base layer was Lyondell M6211. The original coextruded sheet included a base HDPE layer, two outer skin layers, and two intermediate adhesion promoter layers, having the structure: skin/adhesion promoter/base/adhesion promoter/skin. The resulting film was 1 mil thick, with the outer layers being 0.05 mil each (Exs. T–W) or 0.04 mil each (Exs. X–Z), the intermediate adhesion promoter layer being 0.05 mil each, and the remainder being the HDPE substrate.

Several advantages of the invention are clearly illustrated in these summarized data. First, it is clear that the use of an adhesion promoter layer according to the invention does impart significantly improved properties to a high biaxially oriented HDPE film. For example, when no adhesion promoter layer is employed (Sample T), the adhesion of the outer layer to the base layer was observed to be poor. By contrast, the use of any of the adhesion promoter layers (Samples U–Z) all provided superior adhesion properties.

Another significant advantage is that the significantly improved properties are imparted to the resulting film irrespective of whether the adhesion promoter layer is an HDPE/LDPE blend (Samples U–V or X–Z) or MDPE (Sample W). Also, the films possessed good adhesive qualities irrespective of whether the HDPE/LDPE blend was 90% HDPE/10% LDPE or 80% HDPE/20% LDPE.

Finally, it is significant to note that in high biaxial orientation processes, it is typically necessary to use high MDO stretch temperatures, making the biaxial orientation process substantially more difficult to perform than lower orientation processes. In the group of samples in Table IV above, Samples T–X all used a MDO stretch temperature of 283° F. A comparison of Samples X–Z, however, shows that an adhesion promoter layer according to the invention also permits the use of substantially lower MDO stretch temperatures, i.e., as low as 275° F., while not perceptibly affecting the quality of skin layer adhesion. Indeed, MDO temperatures can be further reduced using the method of the invention, such that MDO temperatures of about 265° F. are routine and further reductions are practicable. Accordingly, the use of an adhesion promoter layer not only improves adhesion of skin layers, but the process of high biaxial orientation is itself made easier than would otherwise be possible.

EXAMPLE 4

A biaxially oriented film is produced as follows: HDPE is extruded through a main extruder. Two satellite extruders extrude a layer of a low density polyethylene onto either side of the HDPE. Two further satellite extruders extrude a copolymer of 96.5% propylene and 3.5% ethylene onto each of the adhesion promoter layers. The extrudates are fed through a three layer melt adaptor into a die, to provide a five-layer (i.e., ABCBA structure) co-extrudate, in which the LDPE adhesion promoter layers together comprise about 10% of the total weight of the extrudate, and the outer propylene copolymer layers together comprise about 4% of the total weight of the extrudate.

The co-extrudate is then cast onto a chill roll with no water bath. The cast sheet is then fed into MD orientation apparatus consisting of pre-heat, stretch and annealing rolls. The film is MD stretched to about 6 MDX. Post-MD orientation annealing is performed at a lower temperature. TD orientation in a tenter frame apparatus is performed, stretching the film to about 11 TDX. Immediately following TD stretch, annealing is performed, resulting in a film having about 1.0 mil thickness and substantially uniform gauge, with good optical characteristics.

Following orientation, the thick edges of the film, that have been gripped in the tenter clips, are trimmed off. For convenience, the web is trimmed to a desired narrow width. The film is then corona-treated on one side to a desired wetting tension, and wound on a roll.

EXAMPLE 5

A film is prepared generally in accordance with the method described in Example 2. In this case, the HDPE substrate contains about 10 wt % calcium carbonate ($CaCO_3$) as a cavitating agent. Also, each of the adhesion promoter layers (together comprising about 15% of the total weight of the film) contains about 4% titanium dioxide ($TiO_2$) as a whitening pigment. A film having a desired degree of opacity is produced.

Thus, while there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

What is claimed is:

1. A multilaminar film, comprising:
    a) an HDPE substrate comprising high density polyethylene (HDPE) having a density of at least about 0.940 g/cm$^3$ and a melt index of from about 0.1 to about 10,
    (b) an adhesion promoter layer coextensively adhered to the HDPE substrate, comprising a polyethylene material having a density lower than the density of the HDPE in the HDPE substrate; and
    (c) an outer layer coextensively adhered to the adhesion promoter layer, comprising a propylene copolymer,
    wherein the multilaminar film is high biaxially oriented, including having been stretched to a degree of from about 5:1 to about 8:1 in the machine direction and to a degree of from about 6:1 to about 15:1 in the transverse direction.

2. A multilaminar film according to claim 1, wherein the polyethylene material of the adhesion promoter layer is selected from the group consisting of very low density polyethylenes (VLDPE), high pressure low density polyethylenes (HP-LDPE), linear low density polyethylenes (LLDPE), medium density polyethylenes (MDPE), blend of two or more of these, and blends of one or more of these with a high density polyethylene.

3. A multilaminar film according to claim 1, wherein the polyethylene material of the adhesion promoter layer is a medium density polyethylene or a blend of a low density polyethylene and a high density polyethylene.

4. A multilaminar film according to claim 3, wherein the polyethylene material of the adhesion promoter layer is a blend of a low density polyethylene and a high density polyethylene, comprising from about 2 wt % to about 50 wt % LDPE.

5. A multilaminar film according to claim 3, wherein the polyethylene material of the adhesion promoter layer is a blend of a low density polyethylene and a high density polyethylene, comprising from about 5 wt % to about 25 wt % LDPE.

6. A multilaminar film according to claim 1, wherein the propylene copolymer of the outer layer has a rate of crystallization and a crystallinity lower than that of the HDPE of the substrate.

7. A multilaminar film according to claim 1, wherein the propylene copolymer of the outer layer is a copolymer or terpolymer comprising at least about 80% propylene with at least one other alpha olefin.

8. A multilaminar film according to claim 7, wherein the propylene copolymer of the outer layer is an ethylene-propylene copolymer comprising about 96.5% propylene and about 3.5% ethylene or an ethylene-propylene-butylene terpolymer comprising about 3% ethylene, about 93% propylene and about 4% butylene.

9. A multilaminar film according to claim 1, further comprising:

(a) first and second adhesion promoter layers coextensively adhered to first and second sides of the base layer, respectively; and (c) first and second outer layers, coextensively adhered to the first and second adhesion promoter layers, respectively.

10. A method of making a biaxially oriented high density polyethylene (HDPE) film, comprising:

biaxially orienting in the solid state a multilaminar HDPE sheet comprising:

(a) an HDPE substrate comprising HDPE having a density of at least about 0.940 g/cm$^3$ and a melt index of from about 0.1 to about 10, (b) an adhesion promoter layer coextensively adhered to the HDPE substrate, comprising a polyethylene material having a density lower than that of the HDPE in the HDPE substrate; and (c) an outer layer coextensively adhered to the adhesion promoter layer, comprising a propylene copolymer, wherein the biaxially orienting comprises machine direction stretching the multilaminar HDPE sheet to a degree of from about 5:1 to about 8:1, and transverse direction stretching the multilaminar HDPE sheet to a degree of from about 6:1 to about 15:1, thereby providing a biaxially oriented HDPE film.

11. A method according to claim 10, wherein the polyethylene material of the adhesion promoter layer is selected from the group consisting of very low density polyethylenes (VLDPE), high pressure low density polyethylenes (HP-LDPE), linear low density polyethylenes (LLDPE), medium density polyethylenes (MDPE), blend of two or more of these, and blends of one or more of these with a high density polyethylene.

12. A method according to claim 11, wherein the polyethylene material of the adhesion promoter layer is a blend of a low density polyethylene and a high density polyethylene, comprising from about 2 wt % to about 50 wt % LDPE.

13. A method according to claim 11, wherein the polyethylene material of the adhesion promoter layer is a blend of a low density polyethylene and a high density polyethylene, comprising from about 5 wt % to about 25 wt % LDPE.

14. A method according to claim 10, wherein the propylene copolymer of the outer layer has a rate of crystallization and a crystallinity lower than that of the HDPE of the base layer.

15. A method according to claim 10, wherein the propylene copolymer of the outer layer is a propylene copolymer or terpolymer comprising at least about 80% propylene with at least one other alpha olefin.

16. A method according to claim 15, wherein the propylene copolymer of the outer layer is a propylene-ethylene copolymer comprising about 96.5% propylene and about 3.5% ethylene or a propylene-ethylene-butylene terpolymer comprising about 93% propylene, about 3% ethylene, and about 4% butylene.

17. A method according to claim 10, further comprising providing the multilaminar HDPE sheet by coextruding the HDPE substrate, the adhesion promoter and the outer propylene copolymer laminated co-extrudate sheet comprising.

18. A method according to claim 10, wherein the biaxially orienting comprises biaxially orienting a multilaminar HDPE sheet comprising first and second adhesion promoters coextensively adhered to first and second sides of the HDPE substrate, an first and second outer propylene copolymer layers coextensively adhered to the first and second adhesion promoter layers, respectively.

* * * * *

UNITED STATES PATENT AND TRADEMARK OFFICE
CERTIFICATE OF CORRECTION

PATENT: 5,885,721

DATED: March 23, 1999

INVENTOR (S): Su er al.

It is certified that error appears in the above-identified patent and that said Letters Patent is hereby corrected as shown below:

Column 20, line 27, delete the word "comprising" following the word "sheet," and Insert a period--.--therefor.

Column 20, line 30, replace the word "promoters" with the words --romoter laters--; Line 32, replace the word "an" following the comma, with the word --and--.

Signed and Sealed this

Tenth Day of August, 1999

Attest:

Attesting Officer

Q. TODD DICKINSON

Acting Commissioner of Patents and Trademarks